Feb. 14, 1950     J. A. M. LECARME     2,497,127
AIRCRAFT CONTROL
Filed July 18, 1946

INVENTOR.
Jacques André Marie Lecarme
BY
Haseltine, Lake & Co.
AGENTS.

Patented Feb. 14, 1950

2,497,127

UNITED STATES PATENT OFFICE 2,497,127

AIRCRAFT CONTROL

Jacques André Marie Lecarme, Aix-en-Provence, France, assignor to Societe Anonyme dite: Societe Nationale de Constructions Aeronautiques du Sud-Est, Paris, France Application July 18, 1946, Serial No. 684,626
In France September 13, 1945

5 Claims. (Cl. 74—471)

The driving of modern machines often requires that several controls be conjugated, that is to say that their actions be at any instant proportional, in ratios which are often variable. For this purpose and in order to readily convert the necessary ratios, it has been proposed to unite the various controls in a single part which can be actuated by the driver by means of one member, one hand for example, the movements of said part being decomposed into elementary movements, each of which converts a separate order transmitted by any suitable means to one of the controlling parts proper. With a little practice, the user thus succeeds in co-ordinating very easily a larger number of multiple controls than that of his normal gripping members.

Thus, in particular, such control devices are used on vehicles and more particularly on aircraft such as aeroplanes, wherein the number of controls which have to be actuated simultaneously is considerable, but it is quite obvious that these devices can be used in all cases in which the number involved is greater than the number of gripping members available to the user at the required instant or in the cases in which said controls have to be conjugated at any instant in a fairly accurate manner, the uniting of these various controls on a single part having furthermore to be made possible by a conjugation, which becomes intuitive with a little habit, of the elementary movements of the single control part.

Thus, for example, the control of the various rudders and ailerons of an aeroplane is grouped in two members; one called the rudder bar actuates the rudder, whereas the other called the control column or joy stick, placed between the pilot's legs and operated with the hand, actuates, in its longitudinal movements in the direction of the axis of travel of the aeroplane, the elevator, and in its transverse movements the ailerons. Said control stick is, for this purpose, swivel mounted, by means of an universal joint or the like, on a fixed member of the aeroplane. Owing to the considerable increase in weight and size of aeroplanes, and in order not to impose excessive strain on the pilot, constructors have been led to replace the transverse movement of the control stick by a rotation of a wheel mounted at the end of said stick. Such an arrangement in fact permits of a greater reduction of the efforts and of the simultaneous action of both of the pilot's hands. But, on the other side, the stick has to be formed by a tubular column of large size which is placed between the pilot's legs and hinders his movements in the same manner as the swivel mounted control sticks originally used. Furthermore, this device with an operating wheel hinders the pilot's visibility towards the front and the bottom of the aeroplane and for all these reasons contributes to make the piloting of aeroplanes, seaplanes and other flying machines, difficult. In addition, it is difficult to obtain air-tightness of the cockpit owing to the fact that such air-tightness has to be effected at the spot where the controls are connected to the joy stick, between a fixed part formed by the floor of said cockpit, and members having complex movements.

The purpose of the present invention is to overcome these various drawbacks and, although advantageously applicable to aircraft, it can be used in all cases in which two controls have to be effected from a single member, the movements of which can be decomposed into two elementary movements, each of which actuates one of the controls. In the case of its application to aircraft, the improved control device according to the invention permits, in particular, while retaining the prior principles of piloting, that is to say those which are in accordance with the prior reflexes of the pilot, of obtaining a maximum clearance of the space in front of him, thus increasing his comfort, his outward visibility and his facility of checking the instruments placed on the instrument panel of the aircraft. Furthermore, and as will be seen hereinafter, the air-tightness of the cockpit can be readily obtained at the spot where the control device passes through the floor of said cockpit, owing to the fact that said air-tightness has only to be ensured between a fixed part and a shaft rotatable about a fixed axis.

The present invention is characterized in particular by the fact that the two controls to be obtained are transmitted from a single member to two concentric actuating shafts by means of an articulated parallelogram, two of the adjacent sides of which are respectively fixed on said shafts and another side of which carries the gripping and operating member or members.

The present invention also covers a number of detail objects which are constituent of the main object and which can be applied separately or in all combinations.

(1) The concentric shafts, at one of the ends of which are respectively fixed two adjacent sides of the articulated parallelogram, are provided at the other end with crank levers or like members from which the rotations of one or of both of said shafts are transmitted by any suitable means to the members to be actuated.

(2) The concentric shafts are substantially vertical and are journalled in supports mounted on a fixed part, the various connecting links and levers forming the articulated parallelogram being located in a substantially horizontal plane.

(3) The gripping and operating member, which is mounted at the end of a lever, a part of the length of which forms one of the sides of the articulated parallelogram, can be double and is preferably formed by one or two handles having a substantially vertical axis, so as to enable the user to rotate the concentric shaft or shafts with one or with both hands.

The present invention furthermore covers a number of particular points which will become apparent in the ensuing description made with reference to the accompanying drawing, which is only given by way of example and in which.

Figure 1:
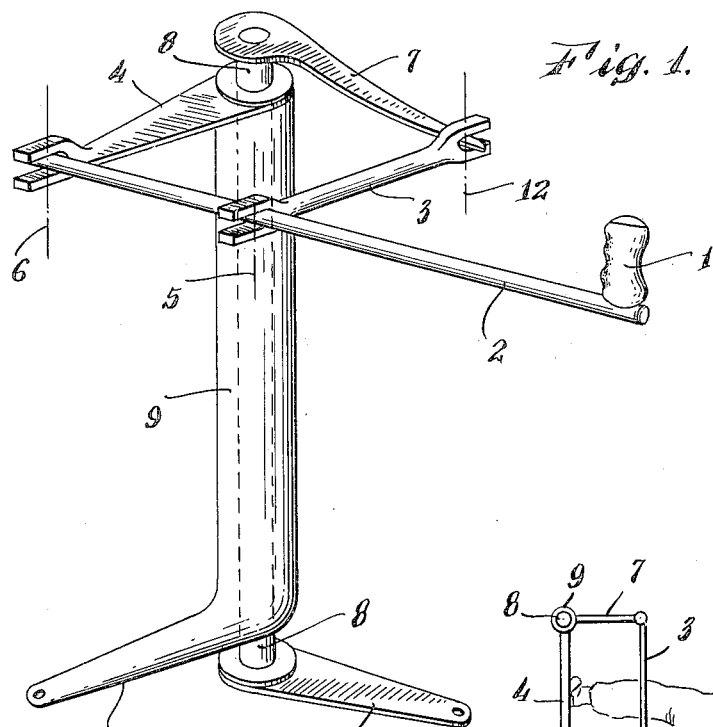
Fig. 1 is a diagrammatical perspective view of a mechanical device with two conjugated controls.

The improved mechanical device with two conjugated controls according to this invention essentially comprises an articulated parallelogram having an arm 2 at the free end of which is fixed, in any suitable manner, an appropriate handle 1. Said device is preferably mounted so that the articulated parallelogram is substantially arranged in a horizontal plane so that the axis of the handle 1 is substantially vertical; the other end of the lever 2 is articulated about a vertical pivot 6 mounted in a jaw provided at the free end of a link 4 secured at its other end to a substantially vertical tubular shaft 9. At an intermediate point of the lever 2 is pivoted, about a vertical pivot 5, a link 3 which is pivoted at its other end on a vertical pivot 12 which is mounted at the free end of a link 7 secured at its other end to a substantially vertical shaft 8 arranged inside the tubular shaft 9 concentrically to same. The articulation and pivotal axes 5, 6, 8, 9 and 12 of the links 4, 7, 3 form the apices of an articulated parallelogram which, in the mean position, is a rectangle. The vertical shafts 8 and 9 are journalled in each other and one of them, 8 for example, is journalled on two fixed parts not shown. On the lower end of said vertical shafts 8 and 9 are respectively fixed crank levers 11 and 10 which are connected by any suitable means to the members which it is desired to control.

The operation of the device with two conjugated controls such as it is hereinbefore described is as follows:

When the handle 1 is actuated from the front towards the rear or vice versa, it will be seen that the arm 2 pushes the links 4 and 3, the link 3 swings about the articulation pivot 12 which remains stationary whereas the link 4 causes the vertical shaft 9 and the crank lever 10 which is secured thereto to swing. On the other hand, the link 7, the shaft 8 and the crank lever 11 secured to said shaft remain stationary.

When the handle 1 is actuated in the direction perpendicular to the previous one, the link 4 remains stationary and the lever 2 swings about the pivot 6 and swings the link 7 by means of the link 3 and consequently the vertical shaft 8 rotates with the crank lever 11 which is secured thereto.

Thus it will be seen that any movement of the handle 1 secured to the lever 2 can be decomposed into two elementary movements which are perpendicular to each other and which respectively cause swings of the shafts 8 and 9 and consequently of the crank levers 10 and 11 secured to said shafts. Instead of a single handle 1, it is possible to fix on the lever 2 two handles suitably arranged to be actuated by the two hands in the case in which the efforts involved are considerable.

Figure 2:
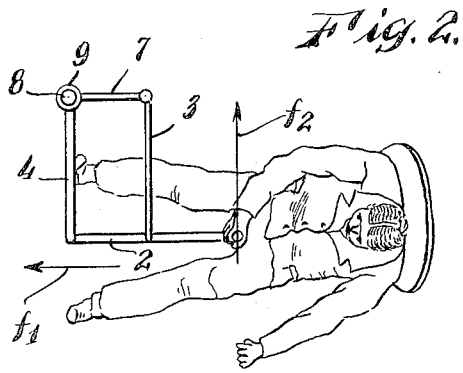
Fig. 2 shows a plan view of the application of such a device to the control of an elevator and of the ailerons of an aeroplane.
Figure 4:
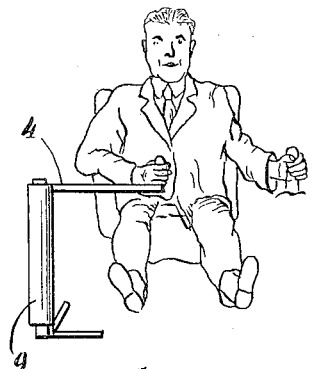
Figs. 3 and 4 are respectively side and front views corresponding to Fig. 2.
Figure 3:
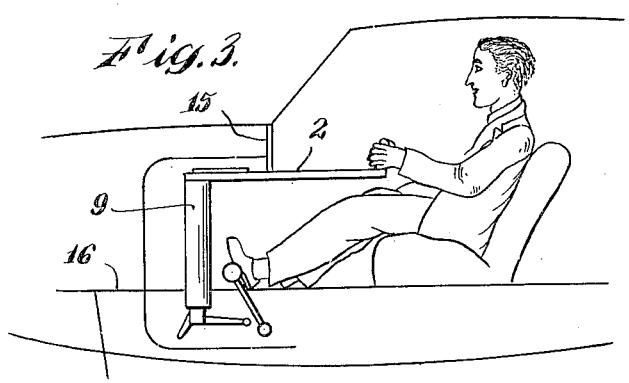

Figs. 2 and 4 show the application of the device according to the invention to the piloting of an aeroplane or other similar machine. In these figures, the same reference numerals designate the same members as in Fig. 1. The shafts 8 and 9 are vertical and are journalled in appropriate supports fixed on the body of the aeroplane in such a manner that said shafts are preferably located completely on the side in order not to hinder the pilot's movements. The crank levers 10 and 11 respectively actuate by any suitable mechanical means, hydraulic, pneumatic, electric or a combination of such means, the elevator control and the aileron control. The horizontal arm 2 carrying the handle or handles 1 passes under the instrument panel 15 of the aeroplane as shown in Fig. 3 or through a slot provided in said panel. The arrangement of said arm 2 is such that, during straight horizontal flight of the aeroplane, the articulated parallelogram formed by the links 3, 4, 7 and the arm 2 is substantially a rectangle (Fig. 2) and the handle 1 is located in the axis of the pilot's body in a similar position to that hitherto occupied by the gripping member of the joy stick. It will be seen, as hereinbefore stated, that a movement of the handle 1 in the direction of the arrow $f^1$ or in the opposite direction will have the effect of rotating the vertical shaft 9 which, by means of the crank lever 10, actuates the elevator.

On the other hand, a movement of said handle in the direction of the arrow $f^2$ perpendicular to $f^1$ or in the opposite direction will have the effect of rotating the vertical shaft 8 which, by means of the crank lever 11, actuates the ailerons.

By a suitable movement of the handle 1, it is possible to obtain a simultaneous movement of the crank levers 10 and 11 of any desired amplitude for each of same, and it will be seen that the movements to be effected by the pilot are dependent on exactly the same reflexes as those which he imparted to a joy stick of the kind formerly used. It will furthermore be seen, in particular in Fig. 3 of the drawings, that air-tightness can be obtained very easily between the outer tubular shaft 9 and the floor 16 of the cockpit, since said shaft 9 has a circular movement of only very small amplitude. The possibility of fitting two handles 1 on the levers 2 enables the pilot to exert a comparatively large force on said lever by means of his two hands, whereas the arrangement adopted enables the space occupied by the pilot's legs to be completely cleared owing to the fact that the shafts 8 and 9 are located at the side of the cockpit. But such an arrangement is in no way essential and it would be possible, without exceeding the scope of the present invention, to use any other arrangement more appropriate to particular requirements. In fact, the drives transmitted by the lever 2 from the handle 1 being analysed into two rotations of the shafts 8 and 9 by means of the articulated parallelogram, said drives can be transmitted from the crank levers 10 and 11 respectively secured to said shafts by any suitable known means. Thus, although it is particularly advantageous in certain cases to give to the vertical shafts 8 and 9 a sufficient length for the two crank levers 10 and 11 to move in horizontal planes, which are adjacent but remote from the plane of the articulated parallelogram and, for example, in horizontal planes located under the floor 16 of the cockpit, cases may arise in which these three planes should be close together. This will occur in particular in certain large aeroplanes or seaplanes in which it may be advantageous to run the controls horizontally to some distance away from the pilot before bringing them vertically upwards and downwards, and such an arrangement is particularly easy to effect with the control device which is the object of the present invention since it suffices to reduce the length of the vertical shafts 8 and 9.

The present invention is not limited to the forms of embodiment hereinbefore described and illustrated, but covers all those involving the characteristics hereinbefore set forth and which are suitable for the purpose required.

What I claim as my invention and desire to secure by Letters Patent is:

1. A mechanical device for piloting aircraft by conjugated action of the pilot on the controls of said craft, comprising, in combination, two concentrical actuating shafts, an articulated parallelogram, two adjacent sides whereof are respectively secured to one end of said shafts, a gripping and operating member fixed to one of the two other sides of said parallelogram and means for transferring in planes different from the plane of said parallelogram the movements of its two sides secured to said shafts.

2. A mechanical device for piloting aircraft by conjugated action of the pilot on the controls of said craft, comprising, in combination, two concentrical actuating shafts, an articulated parallelogram, two adjacent sides whereof are respectively secured to one end of said shafts, a gripping and operating member fixed to one of the two other sides of said parallelogram and crank levers fixed respectively to the other end of said shafts, respectively connected to the two controls of said aircraft and adapted to be moved respectively at an angular displacement equal to that of the corresponding side of said parallelogram secured to the same shaft.

3. A mechanical device for piloting aircraft by conjugated action of the pilot on the controls of said craft, comprising, in combination, two concentrical actuating vertical shafts located in the cock-pit before and on the side of the pilot and crossing the floor of said cock-pit, an articulated parallelogram, two adjacent sides whereof are respectively secured to upper end of said shafts, a gripping and operating member fixed to one of the two other sides and crank levers fixed respectively to the lower end of said shafts, respectively connected to the two controls of said aircraft and adapted to be moved respectively at an angular displacement equal to that of the corresponding side of said parallelogram secured to the same shaft.

4. A mechanical device for piloting aircraft, according to claim 3, wherein the gripping and operating member is substantially located in the longitudinal plane passing through the middle of the pilot seat, in front of the pilot.

5. A mechanical device for piloting aircraft, according to claim 3, wherein the parallelogram is substantially a rectangle during straight horizontal flight of the aircraft.

JACQUES ANDRÉ MARIE LECARME.

REFERENCES CITED

The following references are of record in the file of this patent:

UNITED STATES PATENTS

| Number | Name | Date |
| --- | --- | --- |
| 1,285,076 | Dunn | Nov. 19, 1918 |
| 1,880,138 | Hubl | Sept. 27, 1932 |
| 2,045,621 | Spitzglass et al. | June 30, 1936 |

FOREIGN PATENTS

| Number | Country | Date |
| --- | --- | --- |
| 520,457 | Great Britain | Apr. 24, 1940 |